Feb. 24, 1942. D. O. BRANT 2,273,927
STRAINER
Filed Dec. 17, 1938
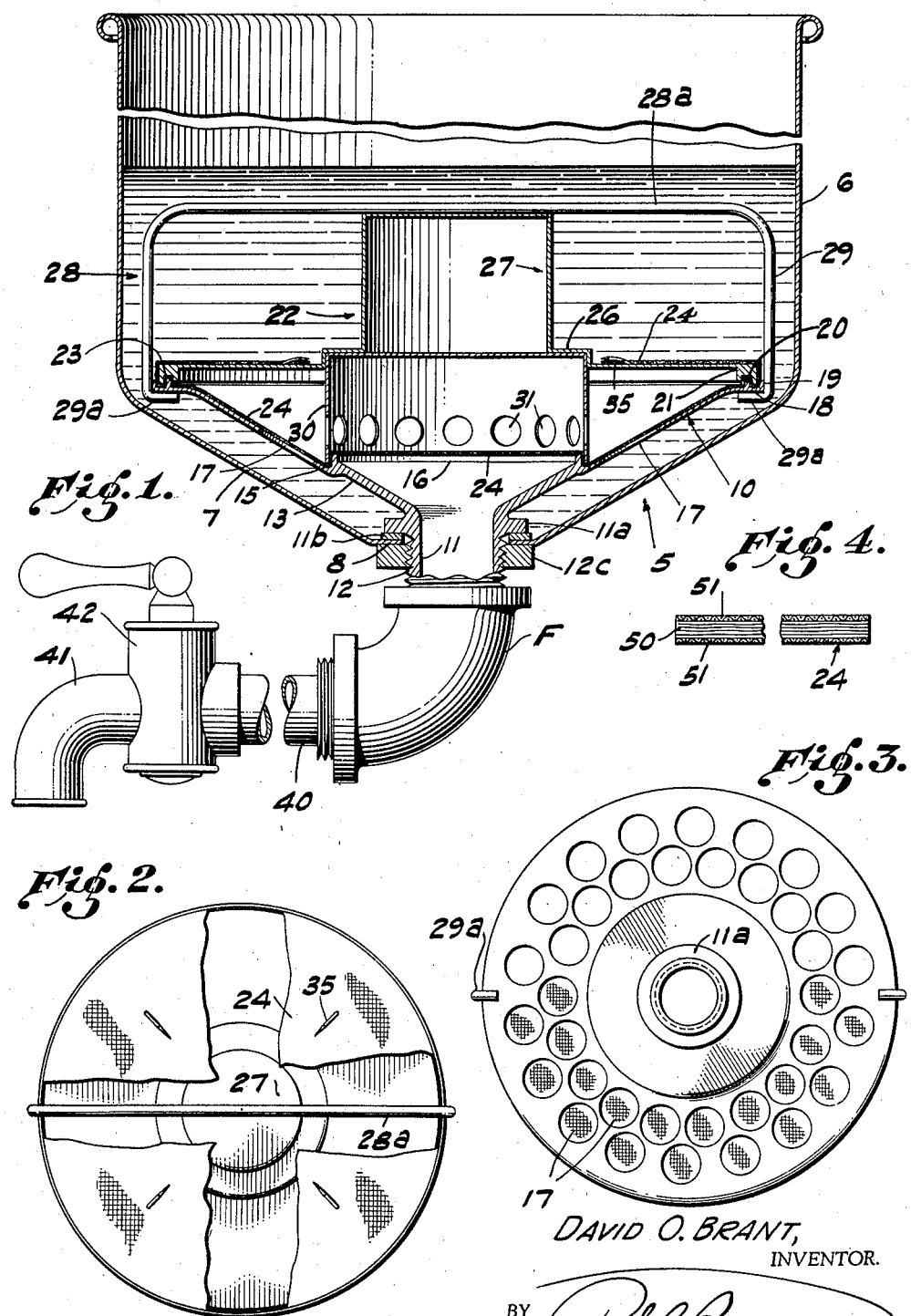
DAVID O. BRANT,
INVENTOR.
BY
ATTORNEY.

Patented Feb. 24, 1942

2,273,927

UNITED STATES PATENT OFFICE 2,273,927

STRAINER

David O. Brant, Canoga Park, Calif.

Application December 17, 1938, Serial No. 246,406

4 Claims. (Cl. 210—159)

This invention relates to improvements in milk and other liquid strainers. The invention pertains to that kind of a strainer wherein the liquid being strained, during at least a part of the straining operation, is directed laterally through the straining element.

An object of the invention is to provide a strainer construction of the above stated character wherein the liquid, previously to being strained just before flowing laterally thru the straining element, is caused to pass through a chamber which is constructed in an improved manner with a view to more efficiently trapping any sediment which such liquid may contain.

Another object of the invention is to provide a more sturdy, capacious kind of strainer structure whereby larger quantities of milk or other liquids may be rapidly and efficiently strained and without the pressure of the liquid being strained causing any displacement of the straining elements.

Other objects of the invention pertain to the provision of a superior, simplified arrangement of parts which are more durable and economical in use and which can be very conveniently assembled and disassembled for the insertion and removal of fresh straining elements.

The invention still further relates as a new article of manufacture to an improved straining fabric or sheet which may be sold separately.

Other objects, advantages, and features of invention will hereinafter appear.

Referring to the accompanying drawing, which illustrates what is at present deemed to be a preferred embodiment of the invention, Fig. 1 is a view, principally in vertical section, of a strainer construction embodying the invention.

Fig. 2 is a top plan view of the portion of the structure which carries the straining element, shown detached from the reservoir.

Fig. 3 is an under side plan view of the structure shown in Fig. 2.

Fig. 4 is a sectional view of a fragment of a composite sheet of straining material which constitutes a new article of manufacture hereinbefore referred to.

Referring in detail to the drawing, a reservoir 5 receives in its bowl 6 the liquid to be strained and has a funnel-like bottom 7 terminating axially in an inwardly directed annular lip 8.

A strainer frame 10 is provided at its lower end with a tubular outlet portion 11 having external screw-threads 12 whereby it may be screwed, in an upstanding position, into the outlet fitting F. Upon said threads 12 is also screwed a nut 12c. The upper part of the tubular member 11 has formed around it an annular flange 11a. This part of the structure is completed by means of a gasket 11b, thus enabling the user to clamp the parts together in a liquid tight manner.

Above its outlet portion, the strainer frame 10 has an inverted cone portion 13 which extends from its flange 11a at an inclination which approximately parallels the inclined bottom 7 of the reservoir, and which has an annular ledge 15 bordered internally by an upstanding circular flange 16. Above said flange, the frame continues upwardly at substantially the same inclination, this part thereof having through it a multiplicity of liquid passage openings 17. Still farther up, said frame has an outwardly directed, substantially horizontal annular flange 18 which forms its rim, and which is furnished along its outer edge with an upstanding circular lip 19 and in an inwardly spaced relation to said lip with an upstanding flange 20.

Upon said flange 20 seats the thickened rim portion 21 of a composite cover member 22, said rim 21 having an annular downwardly directed groove 23 sufficiently wide and deep in cross section to fit over the flange 20 with the downwardly directed portion of the straining fabric 24 interposed.

The cover member 22 is of a composite character, its upper part being furnished with a concentric annular rise 26 which joins a central, cylindrical dome 27. This dome is designed to cooperate with an angularly shaped bail 28, the limbs 29 of which have inwardly directed ends 29a that underlie the strainer frame flange 18 and clamp the parts in place, as shown in Fig. 1. The bail 28 is of a sturdy character, but there is sufficient resiliency in its unsupported portions 28a, at each side of the dome 27, to insure firm pressure of its terminal portions 29 underneath the strainer frame flange 18, to prevent the liquid pressure from upwardly displacing the cover member.

The cover member 22 is completed by welding thereto an inverted cup shaped member 30, the open side of which overlies the central portion of the straining fabric 24, the rim, or mouth portion of said cup fitting tightly down upon said fabric externally of the flange 16 to prevent short circuiting of the liquid toward the outlet. Said cup 30 is provided with a series of liquid admission openings 31 through its side wall in order to conduct the liquid being strained to the portion of the straining fabric 24 which is encompassed by the mouth of said cup, where the second straining operation is performed.

The cover member 22 is furnished in an outwardly spaced relation to its dome 27, with a plurality of inwardly directed prongs 35, over which are impaled the corner portions of the fabric 24 when the parts are assembled with said fabric in its operative, straining position. These prongs afford a further means for stabilizing the straining element against the pressure of the liquid element being strained.

It will be seen that, in the lower portion of the assembled structure, the parallel, widely spaced apart walls 7 and 13 form a chamber, a considerable portion of which is located below the initial, liquid admission openings 17, where the first straining operation takes place as the liquid flows in an upward direction. This lower portion of said chamber forms a spacious dead end sump which is well out of the path of the liquid stream and which will therefore not be agitated in an objectionable manner thereby. Moreover, it can be easily and thoroughly cleansed when the structure is disassembled.

A liquid delivery conduit 40 (of any desired length) is shown leading from the fitting F, the flow through the spout 41 of said conduit being controlled by a manually operable valve 42.

Gasket 11b may be made in a varying thickness to accommodate the size of the dead end sump, all depending on the cleanliness of the dairy and resulting condition of the milk with regard to the amount of sediment therein.

The wall 7 may be made steeper in case a greater amount of sediment is present, thus directing it into the dead end sump before it has a chance to flow horizontally through the straining apertures 31.

The strainer construction, to which this invention pertains, will operate well with any fairly good straining material made of cotton or flannel. However, for the best and most efficient use as a milk strainer, a thinner cotton than is generally used for such purposes (as the milk passes through it twice) should be used. This kind of a cotton 50 is shown in Fig. 4, faced on both sides with a fine-mesh gauze 51. The cotton works best if it is carded in such a manner that its fibers are side by side, as shown in this view, rather than if they extend in every direction as in cotton wadding. By using the cotton as shown, a more even thickness results with no thin spots through which the milk would channel without straining.

The gauze 51 backs up the cotton against the force of the milk passing through it and prevents the cotton fibers thereof from separating to such an extent as to discharge the milk without straining. The gauze acts as an efficient support to keep the layer of cotton in place. When the cotton fibers are directly exposed to the milk, the lighter sediment tends to cling to them and cause an obstruction which slows up the flow of the milk. Also, in such a case, the particles of the sediment will gradually dissolve more or less in the milk and will thus be carried through the strainer sheet. But, with the fine mesh gauze first meeting the inflowing milk, the particles of sediment do not cling to the hard threads of the gauze; and the sediment therefore settles into the sediment trap where it remains in the dead pool of milk without plugging the strainer nor dissolving in the still milk. When flannel is used, best results are obtained from that with nap on only one side.

Cotton cannot be washed and used over again, but thrifty dairymen often wash flannels and use them until they are threadbare. Unless flannel is used over again, there is a heavy waste which results from it being impossible to cut the squares used economically from the widths usually sold. But this kind of waste does not occur with regard to cotton batting.

The mesh of said gauze should be made up of from thirty to forty-five threads per inch in both directions.

Referring to certain improved details of construction, the fact that the wall 13 is inclined permits the height of the second straining element defined by the circular flange 16 to be modified to procure the maximum flow of strained milk through the apparatus without appreciably affecting the quantity of milk in the sediment sump.

Efficient separation of particles of solid matter from the milk being strained results from the fact that the milk flows inwardly in a horizontal direction from all sides of the inclined portion 24 of the strainer cloth or fabric, and the movement of the milk in said horizontal direction is rather slow owing to the fact that the annular space below said fabric portion 24 extends completely around the strainer and is also of a considerable vertical dimension. This relatively slow horizontal movement of the milk favors the sinking of the solid matter therein toward the lower wall of the space through which it is flowing, whence it gravitates to the bottom of the sediment chamber.

In the assembling of the device, the two separable parts of the strainer frame are first assembled with the fabric portion thereof in place between them. This is done by turning the upper section, as viewed in Fig. 1, to an inverted position wherein the flat surface of the dome 27 may rest upon a horizontal supporting surface. Thereupon, the fabric straining sheet is spread over the inverted strainer section and its corners are applied to the prongs 35 under a moderate tension. Then, the other strainer section is applied in the proper relation, causing the fabric to be stretched out because of the considerable amount of slack taken up therefrom along the inner flange 16 and outer peripheral lip 19 of that section of the strainer frame which is lowest when the parts are in position for use. After thus assembling the two strainer frame sections, the bail 28 is applied to clamp the peripheral portions of the two sections together, and then the assembled sections are mounted in the position shown in Fig. 1, and the clamping nut or follower 12c is screwed down to make a fluid tight fit at the outlet, as will be readily understood from Fig. 1.

Dome 27 is of a diameter which is suitable to be grasped by the hand, and after the parts of the strainer frame have been assembled, that is the part which is grasped when placing the strainer in the tank or outer container.

It should be understood that the present disclosure is for the purpose of illustration only and that this invention includes all modifications and equivalents which fall within the scope of the subject matter claimed.

What is claimed is:

1. In a structure of the kind described, a strainer frame having an upper section of a circular character with a substantially flat topped dome upstanding from its central portion, and a lower section, said sections detachably meeting each other along two horizontally and vertically spaced inner and outer joints, said outer joint comprising an annular groove and flange, said lower section having a vertical annular rib forming a part of said inner joint downwardly spaced from said outer joint and a downwardly directed central outlet downwardly spaced from said annular rib, a strainer fabric, a portion of which is interposed between the groove and flange portions of said outer joint, the portion of said fabric circumscribed by the latter joint being downwardly directed and extended horizontally across said annular rib, said lower section of the frame having apertures to direct the liquid being strained through said downwardly directed portion of said fabric before it reaches a second straining through the horizontal portion of said strainer fabric, said upper section being provided with an inverted cup shaped member, the open side of which overlies the central portion of said strainer fabric, the rim, or mouth of said cup fitting tightly down upon said fabric externally of said annular rib to prevent short circuiting of the liquid toward said outlet, said cup having a series of liquid admission openings through its side wall in order to conduct the liquid being strained to the portion of said strainer fabric which is encompassed by the mouth of said cup where the second straining operation of the liquid is performed, a resilient bail having a substantially straight central portion seated on the flat top of said dome and unsupported side portions to add to the springiness thereof, said side portions having downwardly directed arms which terminate in inwardly directed portions which underlie said outer joint to clamp said upper and lower sections together and thereby make liquid tight the inner and outer joints aforesaid, and an outside container supporting said strainer frame and affording means to conduct the liquid being strained to said fabric, said container having a bottom outlet through which projects the aforesaid outlet of the lower strainer frame section in a liquid tight manner.

2. In a strainer construction, a strainer frame consisting of two separable superimposed sections, each of a circular character, the upper section including in its bottom portion a central inverted cup having liquid passages through its side wall and a horizontal annular portion surrounding the upper portion of said inverted cup, said annular portion having a downwardly facing peripheral portion shaped to cooperate with the periphery of the lower section of said strainer frame to make a liquid tight joint; said lower section being of a funnel shape with a central downwardly directed externally screw-threaded outlet portion, and in an upwardly spaced relation to said outlet portion an internal upstanding annular flange positioned to cooperate with the rim portion of said inverted cup to make a liquid tight fit, there being above said flange also liquid admission openings through said lower section, a single strainer sheet underlying the mouth of said inverted cup and extending radially outward beyond the peripheries of said two strainer frame sections, means to clamp said two sections together with said sheet between them in its operative position, an external container having a funnel shaped bottom with a central outlet, thus providing an annular sump below the last recited liquid passages to collect sediment from the liquid being strained, and means for securing said sectional strainer frame in a concentric, inwardly spaced relation to the lower portion of said container, said securing means including a nut screwing onto the aforesaid threads.

3. A strainer consisting of a reservoir having a conical bottom terminating in outlet portion, a strainer frame having a lower cone portion terminating in a tubular part which projects through said outlet portion of said bottom, a liquid tight connecting means between said tubular part and outlet portion, said cone-portion and the bottom of said reservoir being substantially in parallel to provide a sediment chamber, said frame having a vertical annular rib extending around said cone portion between its top and bottom, there being a plurality of spaced openings extending through the side of said frame above said rib, a vertically directed rim above said openings, a cover plate for said frame having an annular groove at its periphery to receive said rim and a perforated concentric vertical wall disposed to rest upon said rib, a strainer cloth extending between said frame and said cover plate between said plurality of openings and perforated vertical wall, and clamping means to cause pressure of said plate about the rim of said frame and between the rib and said vertical wall.

4. A strainer as set forth in claim 3, wherein the cover plate is provided with an upward extension, and a bail arranged to cooperate with said extension and the peripheral portion of said frame to secure said elements together.

DAVID O. BRANT.